United States Patent Office 3,320,291
Patented May 16, 1967

---

3,320,291
5-FLUORO-6-NITRIMINO- AND 6-KETO STEROIDS AND THEIR PREPARATION
Sam Andreades, Wilmington, and George A. Boswell, Jr., Newark, Del., assignors to E. I. du Pont de Nemours and Company, Wilmington, Del., a corporation of Delaware
No Drawing. Filed Sept. 15, 1964, Ser. No. 396,745
14 Claims. (Cl. 260—397.4)

This application is a continuation-in-part of application Ser. No. 233,191, filed Oct. 23, 1962, and now abandoned.

This invention relates to a new method for introducing fluorine into the steroid nucleus. Specifically, it concerns a new method of preparing certain α-fluoronitrimino and α-fluoroketo steroids. It also relates to certain new and useful steroids bearing fluoro and nitrimino or keto substituents on adjacent steroid carbon atoms.

Since Fried and Sabo [J. Am. Chem. Soc., 75, 2273 (1953); 76, 1455 (1954)] discovered that the introduction of a fluorine atom at the 9-position into cortisol resulted in enhanced biological activity, an ever-increasing amount of research has been directed towards finding new ways of introducing fluorine into the steroid nucleus [for leading references, see, for example, Bowers et al., J. Am. Chem. Soc., 84, 1050 (1962); see also Fieser & Fieser, "Steroids." Reinhold Publishing Corp. 1959, especially at pages 682–699 for fluorocorticoids and 592–597 for fluorosteroids which have anabolic properties (aid to tissue building, protein utilization)]. This increasing activity in the fluorosteroid field is due to the advantages which frequently accrue from the presence of fluorine in steroidal drugs, such as increased potency, decreased toxicity and greater efficacy (for instance high anti-inflammatory activity).

The replacement of hydrogen adjacent to a keto or hydroxyl group by fluorine has given the most dramatic effects in steroid modification. However, previous methods of effecting this replacement have been indirect and complicated, involving for example the action of a fluorinating agent such as hydrogen fluoride or boron trifluoride on epoxidated steroids, which must first be synthesized. Other known fluorinating methods are not adapted to the replacement of a hydrogen atom adjacent to a keto group. For these reasons, a process which allows steroids to be converted to α-fluoroketo steroids in good yield and in a direct manner constitutes a considerable advance in the art. The method presently to be described is direct and simple and moreover does not affect functional groups that may be present in the steroid molecule, or affects them only to a limited extent if they are sensitive ones.

In accordance with this invention, steroids of the androstane and pregnane series containing fluorine in the 5-position are prepared by a process which comprises a) reacting, under essentially anhydrous conditions and at a temperature not exceeding about 50° C., nitrosyl fluoride with a Δ⁵ steroid of the formula

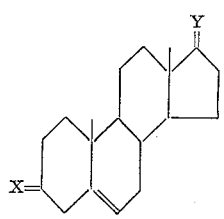

where X is one of the groups

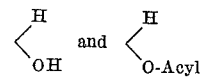

and Y is one of the groups

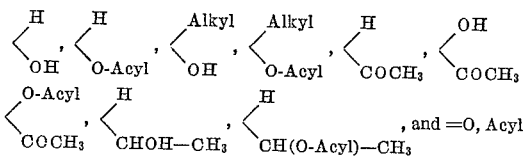

in each instance being a hydrocarbon carboxylic acyl radical having from one to ten carbon atoms, and alkyl being lower alkyl, particularly methyl and methyl, thereby obtaining a 5α-fluoro-6-nitrimino steroid

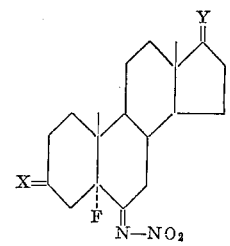

where X and Y are as above; and, optionally, subjecting this 5α-fluoro-6-nitrimino steroid to hydrolysis by neutral alumina, thereby obtaining the corresponding 5α-fluoro-6-keto steroid.

The invention also includes, as a new class of products, the steroids of the general formula

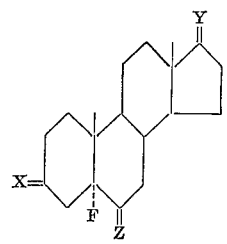

wherein X is selected from the group consisting of (H,OH) and (H,O-acyl); Z is selected from the group consisting of =N—NO₂ and =O; and when Z is =O, Y is selected from the group consisting of (H,OH), (alkyl,OH), (alkyl,O-acyl), (H,COCH₃), (OH,COCH₃), O-acyl, COCH₃), (H,CHOH—CH₃), and (=O); and when Z is =N—NO₂, Y is selected from the group consisting of any one of the above groups defined for Y,(H,O-acyl), and [H,CH(O-acyl)—CH₃].

In the above definitions, the acyl radical can be lower alkanoyl, e.g., formyl, acetyl, propionyl, isobutyryl, hexanoyl, octanoyl, decanoyl, and the like; cycloalkyl-lower-alkanoyl, e.g., cyclopentylacetyl, β-cyclohexylpropionyl, and the like; aroyl or alkaroyl, e.g., benzoyl, p-toluyl, and the like; and aralkanoyl, e.g., phenylacetyl, β-phenylpropionyl, and the like. The acetyl radical is the preferred one.

The reaction sequence described above can be represented by the following equations in which, for the sake of simplicity, only the portion of the steroid molecule entering into reaction is shown.

(a) 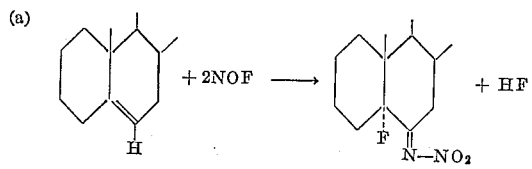

(b) 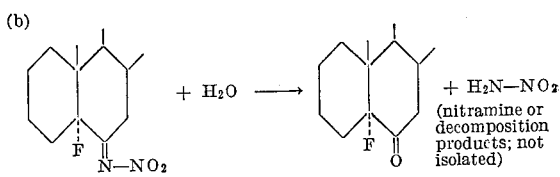

In the first stage of the process of this invention, nitrosyl fluoride is reacted with a $\Delta^5$ unsaturated steroid, as defined, to give a 5α-fluoro-6-nitrimino steroid, as depicted in Equation (a) above. This result is quite surprising in view of the fact that the well known reaction of nitrosyl chloride with olefins leads rather to α-chloronitroso adducts or the isomeric α-chlorooximes and that the latter dehydrohalogenate on hydrolysis. It was therefore entirely unexpected to find that the reaction of nitrosyl fluoride with unsaturated steroids yields the α-fluoronitrimine rather than the α-fluorooxime, and that the α-fluoronitrimine shows no tendency to dehydrohalogenate.

This reaction is conducted simply by bringing nitrosyl fluoride in contact with the unsaturated steroid at least partly dissolved in an anhydrous organic solvent essentially inert towards nitrosyl fluoride under the reaction conditions. Examples of such solvents are the saturated hydrocarbons such as the hexanes or octanes and saturated halocarbons such as carbon tetrachloride, trichlorofluoromethane, sym.-tetrachlorodifluoroethane, perfluorooctane, perfluorodimethylcyclohexane, etc.

The relative proportions of the two reactants are not critical but, in order to insure completion of the reaction and facilitate the isolation of the product, it is preferred to use the nitrosyl fluoride in the ratio of at least two moles per mole of unsaturated steroid. However, this is not essential and a lower molar ratio, for example 1:1, can be used. An excess of nitrosyl fluoride, up to for example 10 moles per mole, is often desirable to insure completion of the reaction. However, when the radicals present at the 3- and 17-positions contain hydroxyl groups, which are somewhat sensitive, a large excess of nitrosyl fluoride is undesirable.

The reaction is exothermic and can take place at a very low external temperature, for example as low as −80° C. Temperatures in excess of about 50° C. lead to undesirable side reactions such as nitration and are not recommended. The preferred temperature range is that between −20 and 5° C.

The entire operation should be conducted in the substantial absence of moisture since nitrosyl fluoride reacts rapidly with water. However, small amounts of moisture can be tolerated, provided sufficient nitrosyl fluoride is left for the desired reaction. Absence of atmospheric oxygen is also desirable since oxygen has a deleterious action on nitrosyl fluoride and would cause loss of some of this reactant. The reaction is carried out in equipment constructed of, or lined with, materials that are essentially inert to nitrosyl fluoride. Examples of suitable materials are polytetrafluoroethylene, polyethylene, nickel and high nickel alloys such as Monel metal and the alloys known under the name of "Hastelloy."

The reaction is most conveniently conducted at atmospheric pressure, but superatmospheric pressures can also be used if desired.

The resulting 5α-fluoro-6-nitrimino steroid can be isolated simply by evaporating the solvent under atmospheric or reduced pressure. Another method of removing the by-product hydrogen fluoride consists in treating the reaction mixture with water and extracting the organic material with a suitable solvent such as carbon tetrachloride. In this connection, it should be noted that, even though the nitrimino group is hydrolyzable to the keto group (this being the second stage of the process), no appreciable hydrolysis takes place on treatment with water alone at temperatures not exceeding about 50° C., especially if it is not unduly prolonged. Thus, washing the reaction product with water at ordinary temperature, followed by extraction, does not appreciably decrease the yield.

No purification of the 5α-fluoro-6-nitrimino steroid is necessary when it is to be converted to the 5α-fluoro-6-keto steroid. If it is to be isolated as such, the fluoronitrimino compound can be purified by conventional methods such as crystallization, fractional crystallization, chromatography, etc. The 5α-fluoro-6-nitrimino steroids are solid, crystalline materials soluble in most of the common organic solvents.

The structure of these compounds is established by the following facts: First, since, upon hydrolysis, an α-fluoroketone of proven structure (see below) is obtained, an α-fluoroketimino group is evidently present. Second, the infrared spectrum shows bands characteristic of C=N (6.15μ) and of —NO₂ (6.4 and 7.6μ). Third, the ultraviolet spectrum shows maximum absorption in ethanol at 267 mμ (ε=about 500) which is typical of a nitro group. Finally, elemental analyses, whenever performed, are in agreement with the assigned structure. Further evidence is afforded by the fact that the nitrimines are stable towards irradiation with ultraviolet light under conditions known to cause photolysis of nitrites.

Some reasonable assumptions can be made regarding the mechanism and intermediates involved in the formation of the nitrimino group, but such a discussion is unnecessary for the present purposes.

Hydrolysis of the 5α-fluoro-6-nitrimino steroid to the 5α-fluoro-6-keto steroid, i.e., the reaction represented by Equation (b) above, is best conducted by a special procedure which makes it possible to hydrolyze the fluoronitrimino steroid rapidly and at room temperature without appreciable hydrolysis of the ester groups that may be present at the 3- and 17-positions. According to this method, which can be viewed as a chromatographic treatment, a solution of the fluoronitrimino steroid in an inert organic solvent such as diethyl ether, petroleum ether, benzene, etc. is absorbed onto a column of neutral alumina containing water in amount at least stoichiometrically equivalent to the nitrimino group present, i.e., in a molar ratio of at least 1:1 relative to the nitrimino compound. As is known, alumina used in chromatographic work is supplied commercially in various grades whose "activities" depend chiefly on the water content [see, for example, Brockmann and Schodder, Ber., 74, 74 (1941)]. Aluminas of activity II–V, which contain, respectively, 3, 6, 10, and 15% of water by weight, are suitable for the hydrolysis of the fluoronitrimino steroids. More strongly hydrated alumina can be used provided it remains in the state of a freely flowing solid. The most generally suitable material is activity III alumina, which contains 6% of water.

Upon contact with water-containing alumina, hydrolysis of the 5α-fluoro-6-nitrimino steroid to the corresponding 5α-fluoro-6-keto steroid takes place practically instantaneously at room temperature (lower or higher temperatures can be used but there is no advantage in doing so). The resulting fluoroketo steroid is then removed from the absorbent column by elution with a suitable solvent such as diethyl ether, petroleum ether, benzene, etc., or a mixture of solvents. In the event impurities, by-products or unchanged starting material are present, this operation also serves as a chromatographic separation, in that the products present are eluted at different rates. If several fractions are obtained in this manner, infrared examination makes it possible to determine which fraction contains the desired products.

The fluoroketo steroid thus obtained is then isolated from its organic solvent solution in any convenient manner. These products are crystalline solids soluble in most of the common organic solvents.

The proof of structure of these products is based on elemental analysis, infrared and ultraviolet spectra, proton and F[19] nuclear magnetic resonance spectra, and subsequent chemistry of these fluoroketones.

The invention is illustrated in greater detail in the following examples. In these examples, the melting points are reported as observed using a Fisher-Johns apparatus unless otherwise noted and are uncorrected. The optical rotation determinations were made in chloroform or in dioxan solution. The values given are followed by the letter c and a number which indicates the concentration (grams of substance per 100 ml. of solvent).

EXAMPLE 1

*3β-acetoxy-5-fluoroandrostane-6,17-dione*

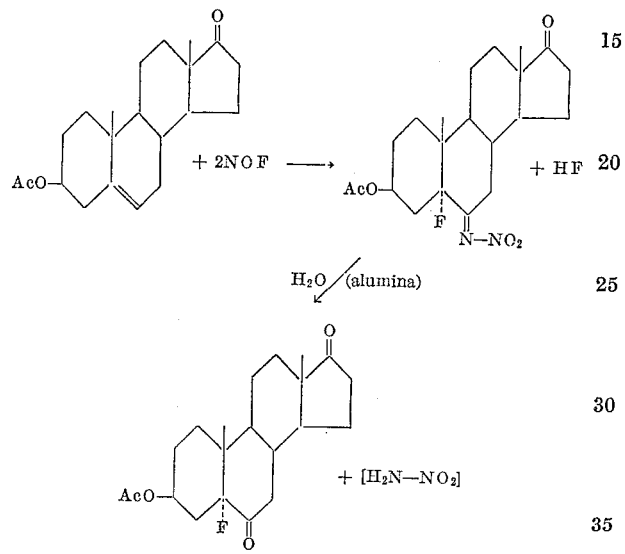

A. In a dry 100 ml. polyethylene reactor equipped with a magnetic stirring bar and gas inlet and exit tubes was place 3β-actetoxy-5-androstene-17-one (10.0 g., 30 millimoles) and carbon tetrachloride (60 ml.). The system was swept with a slow stream of nitrogen to remove moisture and air. The reactor was cooled in an ice bath while nitrosyl fluoride (7 g., 143 millimoles) was passed into the stirred solution for 6 hours. The resulting green reaction mixture was poured into water and the phases were separated. The aqueous phase was extracted with additional carbon tetrachloride. The carbon tetrachloride extracts were washed with water, dried over anhydrous magnesium sulfate, and evaporated under reduced pressure. The residue, a nearly colorless glass, was 3β-acetoxy - 5α - fluoro - 6-nitriminoandrostane-17-one. Infrared:

$$\lambda_{max.}^{CCl_4}\ 5.78\mu\ (C{=}0\ \text{and acetate})$$

6.0μ (C=C–NO₂ or C=N) (weak), 6.12μ (C=N), 6.40 and 7.65μ (—NO₂), 8.15μ (acetate) and 8.65μ (C–F).

B. Without further purification, the total crude product was dissolved in benzene (20 ml.) and adsorbed onto a column of neutral alumina (300 g., activity III) prepared with petroleum ether. Elution with petroleum ether (12 100-ml. fractions) returned a gum (0.387 g.) which was discarded. Further elution with petroleum ether-benzene (1:1, 29 fractions of 100 ml.) returned 3β-acetoxy-5α-fluoroandrostane-6,17-dione (7.74 g., 70.8% yield) as a white crystalline solid, M.P. 184–187° C.

Recrystallization from petroleum ether-methylene chloride returned the fluorodione as long, white blades (6.7 g.), M.P. 187–189° C. An analytical sample was recrystallized (twice) from petroleum ether-acetone to give thick, colorless hexagons, M.P. 189–189.5° C. (capillary tube [α]$^{D24°}$+55° (c. 2.07). Infrared:

$$\lambda_{max.}^{CCl_4}\ 5.78\mu\ (C{=}0\ \text{and acetate})$$

8.15μ (acetate), and 8.65μ (C–F).

*Analysis.*—Calc'd. for C₂₁H₂₉O₄F: C, 69.2; H, 7.96; F, 5.22. Found: C, 69.58; H, 8.04; F, 5.15.

The more polar fractions (0.971 g.) eluted with ether and methanol were partially crystalline and on the basis of their infrared spectra appeared to be the stanol resulting from hydrolysis of the acetate group on the column.

EXAMPLE 2

*3β-acetoxy-5α-fluoropregnane-6,20-dione*

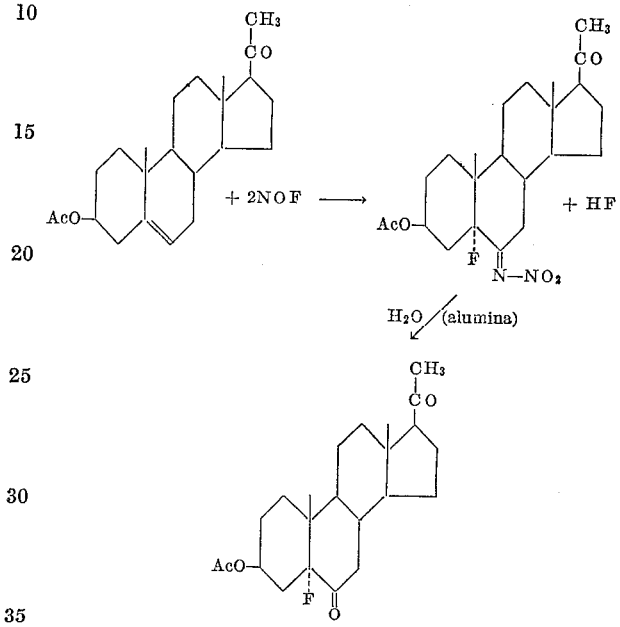

A. A slow stream of nitrosyl fluoride (6 g., 122 millimoles) was passed into a stirred solution of 3β-acetoxy-5-pregnene-20-one (6.5 g., 18.5 millimoles) in carbon tetracholoride (100 ml.) at 0° C. over a 4-hour period. The reaction mixture was poured into water and extracted several times with carbon tetrachloride. The extracts were washed with water and saturated salt solution and dried over magnesium sulfate. The solvent was distilled under reduced pressure to yield the 3β-acetoxy-5-α-fluoro-6-nitriminopregnane-20-one as a thick yellow syrup. Infrared:

$$\lambda_{max.}^{CCl_4}\ 5.80\mu\ (\text{acetate})$$

5.88μ (C=O), 6.15μ (C=N), 6.40 and 7.65μ (—NO₂), 8.15μ (acetate) and 8.65μ (C–F).

B. Without further purification, the total crude reaction product was dissolved in benzene (ca. 20 ml.) and adsorbed onto a column of neutral alumina (180 g., activity III) which had been prepared with petroleum ether. Elution with petroleum ether (four 80-ml. fractions) gave a gummy material (0.048 g.) which was discarded. Further elution with petroleum ether-benzene (1:1) (nineteen 80-ml. fractions) afforded 3β-acetoxy-5α-fluoropregnane-6,20-dione (5.04 g., 71% yield) as a white, crystalline solid, M.P. 150° C. Infrared:

$$\lambda_{max.}^{CCl_4}\ 5.75\mu$$

partially resolved doublet due to (C—6 C=0 and acetate), 5.85μ (C—20 C=0), 8.15μ (acetate) and 8.65μ (C–F). This product was recrystallized from methanol to give long white needles, M.P. 150–153° C. An analytical sample was recrystallized twice from methanol, M.P. 159–161° C., [α]$_D^{24°}$+42° (c. 1.65)

$$\lambda_{max.}^{CCl_4}\ 5.78\mu\ (C{—}6\ C{=}0\ \text{and acetate})$$

5.90μ (C—20 C=0), 8.10μ (acetate) and 8.65μ (C–F).
*Analysis.*—Calc'd for C₂₃H₃₃O₄F: C, 70.3; H, 8.42; F, 4.85. Found: C, 70.13; H, 8.65; F, 5.42.

EXAMPLE 3

(A) *3β,20ξ-diacetoxy-5α-fluoro-6-nitriminopregnane*

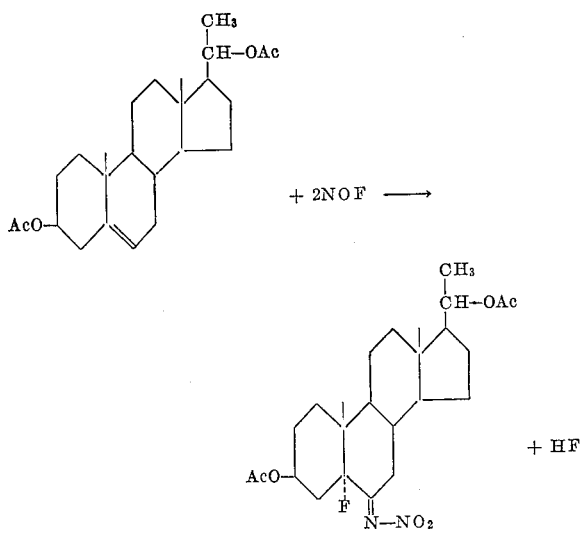

A slow stream of nitrosyl fluoride (10 g., 0.21 mole) was passed over a 7-hour period into a stirred, ice-cooled solution of 3β,20-diacetoxy-5-pregnene (mixture of 20β and 20α epimers; 10.2 g., 26 millimoles) in carbon tetrachloride (50 ml.). The reaction product was isolated in the previously described manner as a pale green oil which crystallized when triturated with a petroleum ether-acetone mixture. The crude 3β,20ξ-diacetoxy-5α-fluoro-6-nitriminopregnane melted at 110–120° C. Its infrared spectrum showed absorptions at 5.8 and 8.0μ (acetate), 6.14μ (C=N), 6.4 and 7.6μ (—NO₂) and 8.6μ (C–F). A 1.0 g. portion of this product after recrystallization from petroleum ether-acetone melted at 165–168° C. (softening at 130° C.), showed [α]$_D^{22°}$ —63° (c. 2.05), and, in the infrared $$\lambda_{max.}^{CCl_4} \ 5.76\mu \ (C=O)$$

6.1μ (C=N), 6.37 and 7.63μ (—NO₂), 8.15μ (acetate) and 8.65μ (C–F).

*Analysis.*—Calc'd for $C_{25}H_{37}N_2O_6F$: C, 62.5; H, 7.7; F, 3.96; N, 5.83. Found: C, 62.73; H, 7.53; F, 3.72; N, 5.86.

EXAMPLE 4

*3β,17β-diacetoxy-5α-fluoro-6-nitriminoandrostane*

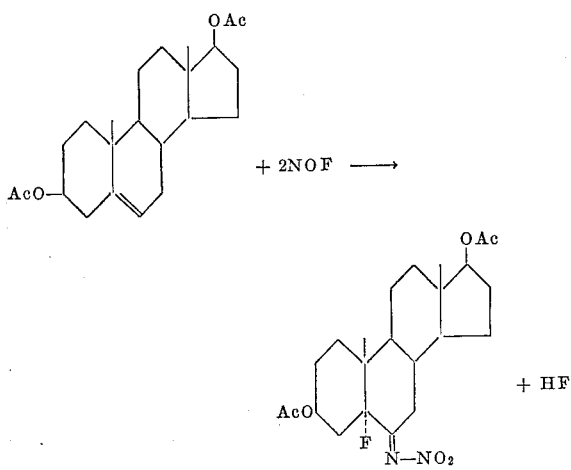

A. A slow stream of nitrosyl fluoride (7 g., 0.142 mole) was passed over a period of several hours into a stirred solution of 3β,17β-diacetoxy-5-androstene (14 g., 37.5 millimoles) in carbon tetrachloride (50 ml.) cooled in an ice bath. The reaction product was isolated with carbon tetrachloride in the previously described manner as a greenish oil (16.82 g.). The infrared spectrum showed that a good conversion to 3β,17β-diacetoxy-5α-fluoro-6-nitriminoandrostane had been achieved. Infrared:

$$\lambda_{max.}^{CCl_4} \ 5.8 \text{ and } 8.15\mu \ (acetate)$$

6.15μ (C=N), 6.4 and 7.65μ (—NO₂) and 8.65μ (C–F).

EXAMPLE 5

(A) *3β,17α-diacetoxy-5α-fluoro-6-nitriminopregnane-20-one*

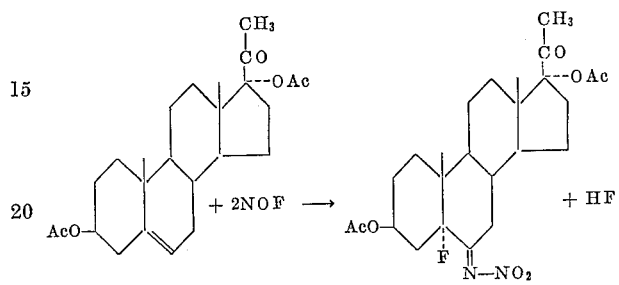

A solution of 3β,17α-diacetoxy-5-pregnene-20-one (8.2 g.) in carbon tetrachloride (100 ml.) was treated with a slow stream of nitrosyl fluoride (4 g.) at about 0° C. for a period of 3 hours. The reaction product was isolated essentially as described in Example 2. A portion (1 g.) of the crude crystalline solid was recrystallized from a methylene chloride-hexane mixture to give 3β,17α-diacetoxy-5α-fluoro-6-nitriminopregnane-20-one as thick, colorless rods, M.P. 185–188° C., [α]$_D^{22°}$ —97° (c. 2.06 Di.).

*Analysis.*—Calc'd for $C_{25}H_{35}FN_2O_7$: C, 60.7; H, 7.12; F, 3.84; N, 5.65. Found: C, 60.34; H, 7.14; F, 3.64; N, 5.57.

(B) *3β,17α-diacetoxy-5α-fluoropregnane-6,20-dione*

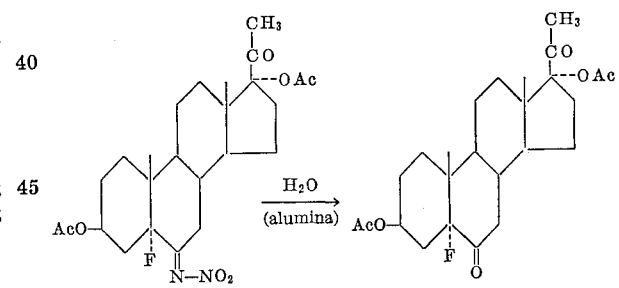

The remainder of the crude fluoronitrimine was dissolved in benzene (30 ml.) and the solution was absorbed onto a column of neutral alumina (200 g., activity III). Elution with petroleum ether-benzene, then with benzene, gave a crystalline material whose infrared spectrum showed complete hydrolysis of the nitrimine function. The crystalline fractions were combined and recrystallized from a methylene chloride-hexane mixture to give 3β,17α-diacetoxy-5α-fluoropregnane-6,20-dione (5.6 g.) as thick needles, M.P. 270° C. After a second crystallization from the same solvent mixture, the product melted at 274–276° C., [α]$_D^{22°}$ —32° (c. 2.14 Di.).

*Analysis.*—Calc'd for $C_{25}H_{35}FO_6$: C, 66.5; H, 7.82; F, 4.21. Found: C, 65.99; H, 7.91; F, 3.79.

The foregoing examples are to be considered as illustrative rather than limitative since the described reaction involving nitrosyl fluoride, followed by hydrolysis over neutral alumina, is broadly applicable to any Δ⁵ steroid of the class previously defined to give, first, a 5α-fluoro-6-nitrimino steroid, then a 5α-fluoro-6-keto steroid, both having at the 3- and 17-positions one of the groups included in the previously set forth definitions of reactants and reaction products.

As already noted, hydroxyl groups are somewhat sensitive to nitrosyl fluoride. This sensitivity is not such as to prevent the desired reaction from proceeding to a useful extent when such groups are present in the starting material, and thus it is entirely feasible to prepare directly 5α-fluoro-6-nitrimino (and keto) steroids containing hydroxyl groups attached to the 3-, 17- or 20-carbon atoms. However, in order to avoid complicating the operating procedures, it is generally preferred to start with a Δ⁵ steriod in which any hydroxyl group at the 3-, 17- or 20-positions is acylated. If desired, these groups can then be hydrolyzed in the resulting 5α-fluoro-6-keto steroid by conventional procedures, for example treatment with strong, non-oxidizing aqueous inorganic acids such as hydrochloric acid, sulfuric acid or phosphoric acid, preferably in a water-miscible, neutral organic solvent such as the lower alkanols, acetone or dioxane, and if desired at elevated temperatures, e.g., 50–100° C. Alternatively, such a strong hydrolytic treatment can be applied to the intermediate 5α-fluoro-6-nitrimino steroid to hydrolyze both the nitrimino group and the ester groups present.

Additional specific examples of products of this invention that can be obtained either directly by the described process from the corresponding Δ⁵ steroids, or by acid hydrolysis of acylated fluoroketo steroids so obtained, include:

5α - fluoro - 6 - nitrimino - 3β - propionoxyandrostane-17β - ol and 5α - fluoro - 6 - keto - 3β - propionoxyandrostane - 17β - ol, from 3β - propionoxy - 5 - androstene-17β-ol;

3β,17α - dibenzoxy - 5α - fluoro - 6 - nitriminoprognane-20 - one and 3β,17α-dibenzoxy-5α-fluoro-6-ketopregnane-20-one, from 3β,17α-dibenzoxy-5-pregnene-20-one;

5α - fluoro - 3β - hydroxy - 6 - nitriminopregnane - 20-one and 5α - fluoro - 3β - hydroxy-6-ketopregnane-20-one, from 3β-hydroxy-5-pregnene-20-one;

3β,20 - di(decanoyloxy) - 5α - fluoro - 6 - nitriminopregnane from 3β,20-di(decanoyloxy)-5-pregnene;

3β - acetoxy - 5α - fluoro - 6 - nitriminopregnane - 20-ol and 3β-acetoxy-5α-fluoro-6-ketopregnane-20-ol, from 3β-acetoxy-5-pregnene-20-ol;

3β - butyroxy - 5α - fluoro - 6 - nitriminoandrostane-17-one and 3β - butyroxy-5α-fluoro-6-ketoandrostane-17-one, from 3β-butyroxy-5-androstene-17-one;

3β - acetoxy - 17α - cyclohexylacetyloxy - 5α - fluoro-6-nitriminopregnane-20-one and 3β - acetoxy-17α-cyclohexylacetyloxy-5α-fluoro-6-ketopregnane-20-one, from 3β-acetoxy-17α-cyclohexylacetyloxy-5-pregnene-20-one;

5α - fluoro - 6 - nitriminopregnane - 3β,20 - diol and 5α-fluoro-6-ketopregnane-3β,20-diol, from 5-pregnene-3β,20-diol;

3β - acetoxy 17α - ethyl - 5α - fluoro - 6 - nitriminoandrostane-17β-ol and 3β-acetoxy-17α-ethyl-5α-fluoro-6-ketoandrostane-17β-ol, from 3β-acetoxy-17α-ethyl-5-androstene-17β-ol;

5α - fluoro - 17α - methyl - 6 - nitrimino - 3β,17β - dipropionoxyandrostane and 5α - fluoro-6-keto-17α-methyl-3β,17β-dipropionoxyandrostane, from 17α-methyl-3β,17β-dipropionoxy-5-androstene;

5α - fluoro - 3β - hydroxy - 6 - ketoandrostane - 17 - one, from 3β-acetoxy-5-fluoro-6-ketoandrostane-17one;

5α - fluoro - 6 - ketoandrostane - 3β,17β - diol, from 3β,17β-diacetoxy-5-fluoro-6-ketoandrostane;

5α - fluoro - 3β,17α - dihydroxy - 6 - ketopregnane - 20-one, from 3β, 17α-diacetoxy-5α-fluoro-6-ketopregnane-20-one.

The 5α-fluoro-6-nitrimino steroids made available by the process of the invention are, as has been shown, of great utility as intermediates in the formation, by a simple hydrolysis step, of the corresponding 5α-fluoro-6-keto steroids. The latter belong to the broader class of α-fluoroketo steroids which, as has already been stated and as is well known [see, for example, U.S. Patents 2,867,635; 2,884,456; 2,855,411; 2,813,109; 2,857,403; J. Am. Chem. Soc. 76, 1455 (1954); 78, 2658 (1956); 81, 5259 (1959); 81, 5262 (1959)] are of already well established and increasing value in various areas of the biological field, either as such or as a source of other fluorinated steroids where the keto group is replaced, through known methods, by other functional groups such as the hydroxy group.

A specific usefulness of the 5α-fluoro-6-keto steroids of this invention (and therefore of their fluoronitrimine precursors) lies in the fact that they are the starting materials in the only known process for preparing a new class of biologically very active products, the 6,6-difluoro-3-keto-Δ⁴ steroids. These compounds, which are described and claimed in copending application Ser. No. 297,709, filed by G. A. Boswell on July 25, 1963 now U.S. 3,219,-673, possess highly valuable biological properties, as will be shown later in detail.

The 6,6-difluoro-3-keto-Δ⁴ steroids are prepared from the 3-acyloxy-5-fluoro-6-keto steroids of this invention by a process which comprises the following sequence of steps. In the equations given for each step, only the reactive part of the steroid, i.e., the 3- to 6-carbon atoms, is shown for clarity of presentation and the by-products, such as $SOF_2$, are omitted for simplicity; R stands for a hydrocarbon radical; and the free valences of the 3-, 5- and 6-carbons are connected to the 2-, 10- and 7-carbons, respectively, of the steroid ring structure.

(1) A 3-acyloxy-5-fluoro-6-keto steroid is reacted with sulfur tetrafluoride, whereby the oxo substituent is replaced by two fluorine atoms, in accordance with the equation:

(1) 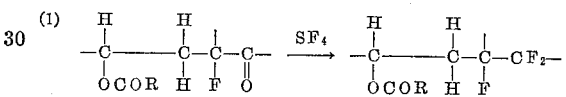

(2) The resulting 3-acyloxy-5,6,6-trifluoro steroid is hydrolyzed in acidic medium, whereby the acyloxy substituent is replaced by hydroxyl, in accordance with the equation:

(2) 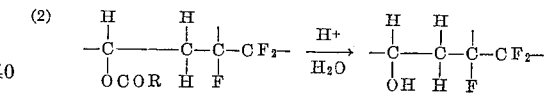

(3) The resulting 5,6,6-trifluoro-3-hydroxy steroid is oxidized to convert the secondary alcohol group to a keto group, in accordance with the equation:

(3) 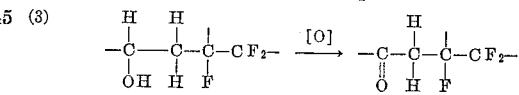

(4) Finally, the resulting 5,6,6-trifluoro-3-keto steroid is treated with a dehydrofluorinating agent, preferably a weak base, such as alumina, whereby dehydrofluorination involving the 5-fluoroine atom and the 4-hydrogen occurs and a 6,6-difluoro-3-keto-Δ⁴ steroid is formed, in accordance with the equation:

(4) 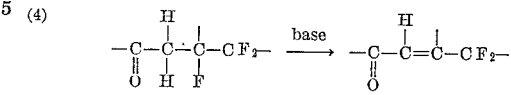

The preferred conditions for operating this process are briefly summarized below.

In the first step, sulfur tetrafluoride is reacted with a 3-acyloxy-5-fluoro-6-keto steroid in a mole ratio SF₄/steroid substantially exceeding 1:1, in an inert solvent such as methylene chloride or carbon tetrachloride and at a temperature in the range of 15–75° C. The reaction is conducted in sealed vessels and hydrogen fluoride in amounts of 1–20 mole percent based on the sulfur tetrafluoride is used as a promoter. In this reaction, other oxo groups that may be present at the 17- or 20-position in the starting material will also be converted, at least in part, to difluoro substituents.

In the second step, the 3-acyloxy-5,6,6-trifluoro steroid is hydrolyzed with a strong, non-oxidizing aqueous inorganic acid such as hydrochloric acid in a solvent such as methanol at a temperature in the range of 50–100° C.

In the third step, the 5,6,6-trifluoro-3-hydroxy steroid, in solution in a water-miscible solvent such as acetone, is oxidized by treatement with a solution of chromium trioxide in 10–50% aqueous sulfuric acid in moderate excess. This exothermic reaction is controlled by maintaining the external temperature in the range of 0–25° C. In this and the preceding step, other acyloxy substituents that may have been present at the 17- or 20-positions of the initial 5-fluoro-6-keto steroid may also be hydrolyzed, then converted to a keto group.

In the last step, the 5,6,6-trifluoro-3-keto steroid is dehydrofluorinated by treatment with neutral alumina of activity II–V. In this method, which has the advantage that it removes hydrogen fluoride and purifies the compound in one single operation under very mild conditions, the 5,6,6-trifluoro-3-keto steroid dissolved in a suitable solvent is adsorbed onto alumina at or near room temperature (15–25° C.) and the product is eluted with an appropriate solvent or combination of solvents, whereby the resulting 6,6-difluoro-3-keto-$\Delta^4$ steroid can be isolated in a satisfactory state of purity.

Representative examples of 6,6 - difluoro - 3 - keto - $\Delta^4$ steroids that can be prepared in the manner described above, using as the starting materials the 3-acyloxy-5-fluoro-6-keto steroids of the present invention, include the following:

6,6,17,17-tetrafluoro-4-androstene-3-one, M.P. 114–117° C., $[\alpha]_D^{22°}$ −12° (c. 1.95 Chf), obtained from the 3β-acetoxy-5α-fluoroandrostane-6,17-dione of Example 1;

6,6,20,20-tetrafluoro-4-pregnene-3-one, M.P. 94–96° C., $[\alpha]_D^{24°}$ 0° (c. 1.85 Chf), obtained from the 3β-acetoxy-5α-fluoropregnane-6,20-dione of Example 2;

6,6-difluoro-4-pregnene-3,20-dione (6,6-difluoroprogesterone), M.P. 134–135° C., $[\alpha]_D^{22°}$ +48° (c. 1.67 Di), obtained from the 3β,20-diacetoxy-5α-fluoro-6-nitriminopregnane of Example 3 by converting it first to the 6-keto steroid;

6,6-difluoro-4-androstene-3,17-dione, M.P. 200° C., obtained from the 3β,17β-diacetoxy-5α-fluoro-6-nitriminoandrostane of Example 4 through conversion first to the 6-keto steroid;

17α - acetoxy - 6,6 - difluoro - 4 - pregnene - 3,20 - dione (17α-acetoxy-6,6-difluoroprogesterone), M.P. 216–217° C., $[\alpha]_D^{23°}$ −26° (c. 2.33 Di), obtained from the 3β,17α-diacetoxy-5α-fluoropregnane-6,20-dione of Example 5.

Other valuable 6,6-difluoro-3-keto-$\Delta^4$ steroids obtained from those mentioned above by additional transformations include 6,6-difluoro-4-androstene-3-one-17β-ol (6,6-difluorotestosterone), M.P. 133–134° C., $[\alpha]_D^{22°}$ −5° obtained from 6,6-difluoro-4-androstene-3,17-dione by sodium borohydride reduction of the keto groups to hydroxyl groups, followed by selective oxidation of the 3-hydroxyl group using 2,3-dichloro-5,6-dicyanobenzoquinone as the selective oxidizing agent; and 17α-ethynyl-6,6-difluoro-4-androstene-3-one-17β-ol (6,6-difluoroethisterone), M.P. 219–220° C., $[\alpha]_D^{22°}$ −56° (Py.), obtained from 6,6-difluorotestrosterone (as the 3-ethylenedioxy derivative) by chromic acid oxidation of the 17-hydroxy followed by ethynylation with acetylene in the presence of potassium tert.-amylate.

The 6,6-difluoro-3-keto-$\Delta^4$ steroids, such as those illustrated above, are characterized by the following combination of biological properties in tests performed on rats: very low androgenic activity (or even antiandrogenic activity, see next paragraph) good anabolic activity and marked antigonadotropic effect. It has long been a goal in steroid research to synthesize compounds in which androgenic and anabolic activties are separated, since anabolic agents are useful in the treatment of a variety of debilitating conditions, in slowing down the ageing process, etc. but their use has been limited because all of the anabolic agents available retain to a large degree androgenic activity which results in rather serious side effects.

Tests on castrate male rats indicated that 6,6,17,17-tetrafluoro-4-androstene-3-one had marked antiandrogenic activity, as shown by the fact that it was 100% effective in blocking the hormonal effect of simultaneously administered testosterone propionate.

Not only do the 6,6-difluoro-3-keto-$\Delta^4$ steroids possess anabolic activity when used in rats while being nearly or completely devoid of androgenic activity, but, in addition, they are antigonadotropic agents, which makes them advantageous in uses where this effect is desired without the powerful primary actions (shown by all sex hormones) which cause serious side reactions.

For example, tests on rats indicate that 6,6-difluorotestosterone had at most 6% of the androgenic activity of testosterone, but between 30 and 63% of its anabolic activity. Furthermore, it had a very definite action in retarding the growth of the testes of immature male rats (about 58% of the controls), indicating a potent antigonadotropic effect.

These results are all the more surprising in view of the fact that the related 6-monofluorotestosterones have about 50% of the androgenic activity of testosterone (H. J. Ringold, "Mechanism of Action of Steroid Hormones," Symposium Publications Division, Pergamon Press, New York, 1961, pp. 213–216). While some of these 6-monofluorotestosterones have antigonadotropic activity (N. Appelzweig, "Steroid Drugs," McGraw-Hill Book Co., Inc., New York, 1962, p. 379), they thus lack the separation of antigonadotropic and androgenic effects shown by 6,6-difluorotestosterone.

A particularly valuable 6,6-difluoro-3-keto-$\Delta^4$ steroid is 6,6-difluoroethisterone, which was found to act as a very effective progestational hormone by either the subcutaneous or the oral route in female rabbits. A 5 mg. dose in the rabbit given orally caused marked proliferation of uterine mucosa. In comparison with currently used progestational agents, which tend to cause masculinization and early maturation of the bones of the female embryo when administered to pregnant females, 6,6-difluoroethisterone has the advantage of being devoid of androgenic (masculinizing) activity. This product was also found to be an effective antiovulation substance in female rabbits. Doses of 4.8 mg. and 2.4 mg. per animal gave 100% inhibition by the subcutaneous route and very substantial inhibitions by the oral route.

As further examples of biological activity, tests on rabbits showed that 6,6-difluoroprogesterone completely inhibited ovulation at doses of either 5 mg. or 2.5 mg. per test animal. 17α-acetoxy-6,6-difluoroprogesterone gave nearly complete inhibition of ovulation in rabbits at 5 mg. per animal. This compound further showed maximum progestational response in female rabbits when administered by the subcutaneous route (4.8 mg. per animal).

The embodiments of the invention in which an exclusive property or privilege is claimed are defined as follows:

1. A steroid of the formula

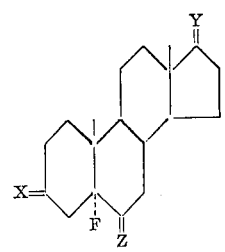

wherein X is selected from the group consisting of (H,OH) and (H,O-acyl); Z is selected from the group consisting of =N—NO$_2$ and =O; and when Z is =O, Y is selected from the group consisting of (H,OH), (alkyl, OH), (alkyl, O-acyl), (H,COCH$_3$), (OH,COCH$_3$), (O-acyl, COCH$_3$), (H,CHOH—CH$_3$), and (=O); and when Z is =N—NO₂, Y is selected from the group consisting of any one of the above groups defined for Y, (H, O-acyl), and [H,CH(O-acyl)—CH₃]; acyl being a hydrocarbon carboxylic acid group of up to 10 carbon atoms, and alkyl being lower alkyl.

2. 3β-acetoxy-5α-fluoroandrostane-6,17-dione.
3. 3β-acetoxy-5α-fluoropregnane-6,20-dione.
4. 3β,17α-diacetoxy-5α-fluoropregnane-6,20-dione.
5. 3β-acetoxy-5α-fluoro-6-nitriminoandrostane-17-one.
6. 3β-acetoxy-5α-fluoro-6-nitriminopregnane-20-one.
7. 3β,20-diacetoxy-5α-fluoro-6-nitriminopregnane.
8. 3β,17β-diacetoxy-5α-fluoro-6-nitriminoandrostane.
9. 3β,17α-diacetoxy-5α-fluoro - 6 - nitriminopregnane-20-one.

10. A process for preparing a steroid of the formula

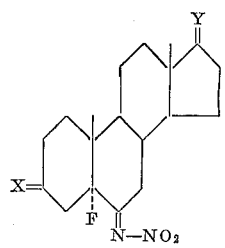

wherein X is selected from the group consisting of (H, OH) and (H, O-acyl); and Y is selected from the group consisting of (H, OH), (H, O-acyl), (alkyl, OH), (alkyl, O-acyl), (H, COCH₃), (OH, COCH₃), (O-acyl, COCH₃), (H, CHOH—CH₃), [H, CH(O-acyl)—CH₃], and (=O); which comprises reacting nitrosyl fluoride under substantially anhydrous conditions at a temperature under 50° C. with a steroid of the formula

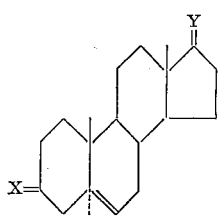

wherein X and Y are as defined above.

11. A process for preparing a steroid of the formula

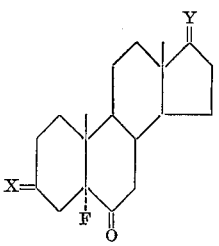

wherein X is selected from the group consisting of (H, OH) and (H,O-acyl); Y is selected from the group consisting of (H, OH), (H, O-acyl), (alkyl, OH), (alkyl, O-acyl), (H, COCH₃), (OH, COCH₃), (O-acyl, COCH₃), (H, CHOH CH₃), [H, CH(O-acyl)—CH₃], and (=O), which comprises hydrolyzing a steroid of the formula

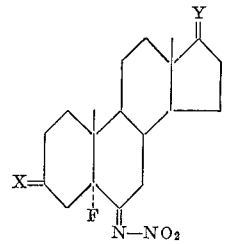

wherein X and Y are as defined above, by chromatographic treatment over hydrated alumina.

12. A steroid of claim 1 wherein Z is =N—NO₂.
13. A steroid of claim 1 wherein Z is =O.
14. A process for preparing steroids of the formula

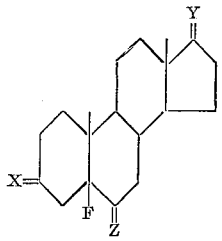

wherein X is selected from the group consisting of (H, OH) and (H,O-acyl); Y is selected from the group consisting of (H, OH), (H, O-acyl), (alkyl, OH), (alkyl, O-acyl), (H, COCH₃), (OH, COCH₃), (O-acyl, COCH₃), (H, CHOH—CH₃), H, CH(O-acyl)—CH₃, and (=O); and Z is selected from the group consisting of =N—NO₂ and =O; acyl being a hydrocarbon carboxylic acid group of up to 10 carbon atoms, and alkyl being lower alkyl; which comprises reacting nitrosyl fluoride under substantially anhydrous conditions at a temperature under 50° C. with a steroid of the formula

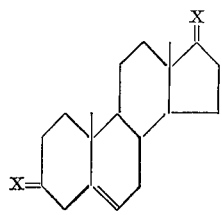

wherein X and Y are defined as above to form a 5-fluoro-6-nitrimino steroid having the above X and Y substituents, followed by hydrolysis of said 5-fluoro-6-nitrimino steroid by chromatographic treatment over hydrated alumina.

References Cited by the Examiner

UNITED STATES PATENTS

| | | | |
|---|---|---|---|
| 3,001,989 | 9/1961 | Ringold et al. | 260—239.55 |
| 3,033,862 | 5/1962 | Ringold et al. | 260—239.55 |
| 3,219,673 | 11/1965 | Boswell | 260—397.3 |

OTHER REFERENCES

Bagli et al.: "Journal Org. Chem.," May 1963, pp. 1207–1217 relied on.

LEWIS GOTTS, *Primary Examiner.*

ELBERT L. ROBERTS, *Assistant Examiner.*